(12) United States Patent
Sheehan et al.

(10) Patent No.: US 8,129,634 B2
(45) Date of Patent: Mar. 6, 2012

(54) CONDUIT CONNECTOR

(75) Inventors: Robert K. Sheehan, Cincinnati, OH (US); Vinayak Manohar Chavan, Maharashtra (IN)

(73) Assignee: Sigma Electric Manufacturing Corporation, Garner, NC (US)

( * ) Notice: Subject to any disclaimer, the term of this patent is extended or adjusted under 35 U.S.C. 154(b) by 455 days.

(21) Appl. No.: 12/391,868

(22) Filed: Feb. 24, 2009

(65) Prior Publication Data

US 2009/0218131 A1    Sep. 3, 2009

Related U.S. Application Data

(60) Provisional application No. 61/067,553, filed on Feb. 29, 2008, provisional application No. 61/069,156, filed on Mar. 13, 2008.

(51) Int. Cl.
*H02G 3/18* (2006.01)
(52) U.S. Cl. ........ 174/666; 174/650; 174/659; 174/665; 174/68.1; 174/68.3; 439/319; 439/544; 439/552
(58) Field of Classification Search .................. 174/666, 174/65 R, 59, 665, 660, 650, 659, 656, 68.1, 174/68.3; 439/319, 544, 552
See application file for complete search history.

(56) References Cited

U.S. PATENT DOCUMENTS

| | | | |
|---|---|---|---|
| 1,049,283 A | 12/1912 | Westphal | |
| 1,131,399 A | 3/1915 | McGinley | |
| 1,355,450 A | 10/1920 | Carlson | |
| 1,659,094 A | 2/1928 | Godfrey | |
| 2,365,785 A | 12/1944 | Tinnerman | |
| 4,151,363 A | 4/1979 | Nichols | |
| 4,496,791 A | 1/1985 | Reichert et al. | |
| 4,641,863 A | 2/1987 | Shemtov | |
| 4,990,721 A | 2/1991 | Sheehan | |
| 5,132,493 A | 7/1992 | Sheehan | |
| 5,200,575 A | 4/1993 | Sheehan | |
| 5,422,437 A | 6/1995 | Schnell | |
| 5,775,739 A | 7/1998 | Gretz | |
| 5,789,706 A | 8/1998 | Perkins | |
| 5,866,853 A | 2/1999 | Sheehan | |
| 5,894,109 A | 4/1999 | Marik | |
| 6,020,557 A | 2/2000 | Jorgensen | |
| 6,034,326 A | 3/2000 | Jorgensen | |
| 6,133,529 A | 10/2000 | Gretz | |
| 6,262,369 B1 | 7/2001 | Marik et al. | |
| 6,335,488 B1 | 1/2002 | Gretz | |
| 6,352,439 B1 * | 3/2002 | Stark et al. | 439/142 |

(Continued)

OTHER PUBLICATIONS

U.S. Appl. No. 12/574,461; Conduit Connector and Methods for Making and Using the Same; Filing Date: Oct. 6, 2009.

(Continued)

*Primary Examiner* — Quyen Leung
*Assistant Examiner* — Thomas Truong
(74) *Attorney, Agent, or Firm* — Cantor Colburn LLP

(57) ABSTRACT

In an embodiment, a conduit connector can comprise: a body comprising a box engagement region capable of engaging an opening in an enclosure and a spring configured to engage the connector and the enclosure. The box engagement region can have a root surface, a leading tab, and a follower tab wherein the root surface and leading tab can be located between a leading edge and a secondary edge. A leading tab perimeter edge and a follower tab perimeter edge define a tab perimeter diameter that is larger than an opening in the enclosure. When the leading tab is inserted into the enclosure the spring can be disposed to engage the secondary edge and the enclosure.

19 Claims, 12 Drawing Sheets

U.S. PATENT DOCUMENTS

| | | | |
|---|---|---|---|
| 6,596,939 B1 * | 7/2003 | Gretz | 174/359 |
| 6,604,400 B1 | 8/2003 | Gretz | |
| 6,709,280 B1 | 3/2004 | Gretz | |
| 6,737,584 B2 | 5/2004 | Kiely | |
| 6,849,803 B1 | 2/2005 | Gretz | |
| 6,872,886 B2 | 3/2005 | Kiely | |
| 6,916,988 B1 | 7/2005 | Auray et al. | |
| 6,935,890 B1 | 8/2005 | Gretz | |
| 7,078,623 B1 | 7/2006 | Sheehan | |
| 7,220,923 B1 | 5/2007 | Sheehan et al. | |
| 7,338,092 B1 | 3/2008 | Cicconi, III | |

OTHER PUBLICATIONS

European Search Report; European Application No. 09153657.2; Date Mailed: Jul. 5, 2011; 7 Pages.

\* cited by examiner

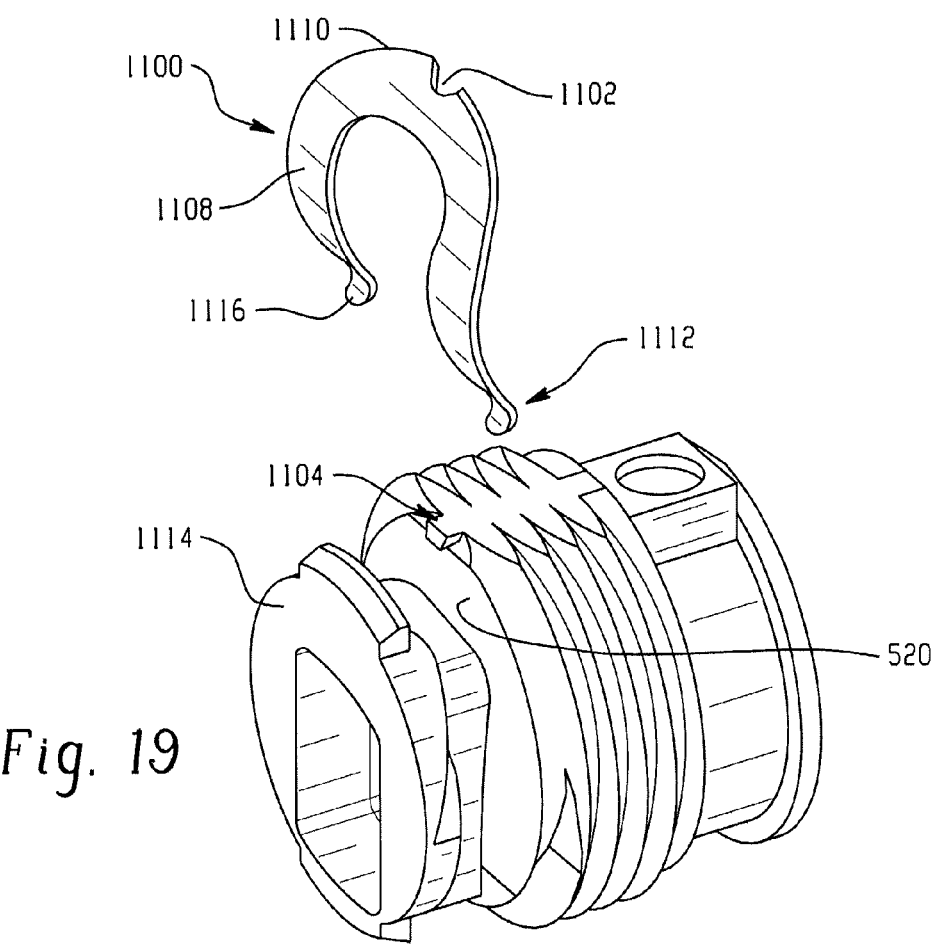
Fig. 19
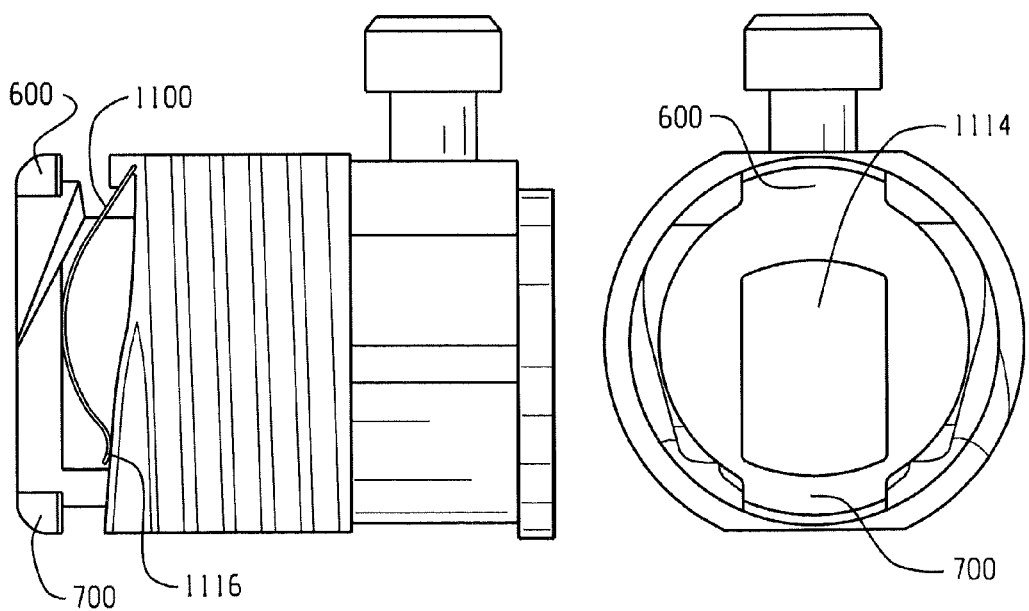
Fig. 20
Fig. 21

CONDUIT CONNECTOR

CROSS REFERENCE TO RELATED APPLICATIONS

This application claims priority to U.S. Provisional Application Ser. No. 61/067,553, filed Feb. 29, 2008 and to U.S. Provisional Application Ser. No. 61/069,156, filed Mar. 13, 2008, both of which are incorporated herein in their entirety.

TECHNICAL FIELD

The instant application relates to adapters for connecting electrical conduit to junction boxes, outlet boxes, or other enclosures, and, more particularly, to an electrical conduit connector with a body, and a spring.

BACKGROUND

The most common use for electrical conduit connectors is to facilitate the connection of a conduit or cable to a junction box. The junction box can be a variety of electrical enclosures such as an outlet box, transformer enclosure, circuit panel, lighting fixture—the list is nearly endless. Similarly, the conduit can be rigid or flexible, or could be hose, other tubing capable of routing electrical wire, or cable. Cable can be non-metallic sheathed cable, portable cord, or a variety of other types of electrical conductors. The instant application is equally successful in connecting a plurality of types of conduits, cables, and other electrical conductors to a wide variety of boxes and other enclosures. Therefore, as used in this specification, the term conduit is not limited to standard rigid electrical conduit, but shall be intended to mean any type of conduit, any type of cable, or any other type of electrical conductor. Many commercial and residential buildings have electrical installations with many types of conduit-to-junction-box connections that utilize electrical connectors.

The two most common types of electrical connectors used are a snap-in connector, and a multipart connector which can be composed of two or more components that utilizes a threaded male end in conjunction with a threaded female locknut, hereinafter referred to collectively as a two-part locknut connector. In the case of the two-part locknut connector, the male threaded end is inserted into the junction box through a knockout (e.g., a hole or other opening). A rigid connection is established by threading the lock nut onto the male end in the junction box interior. The snap-in connector is another commonly used connector, which utilizes a snap ring to quickly connect it to the junction box. Either type of connector is integrated with an adapter end, which allows the attachment of conduit, cable, or a variety of types of hollow tubing.

The installation of electrical systems is generally expensive as an electrician must first install the enclosures, route conduit between each enclosure, and install connectors and then pull all necessary electrical wiring through the conduit. In other words, installation is expensive because it is labor intensive. The commercially available electrical connectors are one factor accentuating the labor intensiveness. Locknut connectors increase the cost of installing electrical systems for a number of reasons. The current art two-part locknut connectors are plagued with labor intensive problems. First, the locknut connectors are shipped from the manufacturer preassembled. That is, the electrician must first remove the locknut from the male end before it can be installed. Once the male end of the connector is placed through the knockout, the electrician must rethread the locknut onto the connector from the interior of the junction box.

Two hands are required to disassemble and then reassemble the connectors in the knockout. Consequently, it is difficult to hold a tool or a piece of conduit while reassembling the connector. Once the locknut is threaded it must be tightened. In accordance with many building codes and safety regulations, connectors must be firmly and reliably attached to junction boxes. To properly tighten the two-part locknut connector, the electrician must use a tool, usually a set of pliers or a screwdriver. Occasionally, when the proper tool is unavailable, an electrician will use any object within reach. These situations, while rare, raise serious safety issues. In many instances, however, to "get the job done" the locknut is "finger" tightened. Those persons skilled in the art know that finger tightened two-part locknut connectors can eventually loosen, and a loose connector can cause great strain to be put onto the electrical wires and their connections resulting in an increase in the probability of an electrical fire or other electrical problems, such as poor grounding.

Secondly, when the electrician disassembles the fitting by taking the locknut off the connector, the locknut can be dropped or misplaced. This can occur when the electrician is in an elevated position, such as, on a scissor lift or on scaffolding because the electrical conduit is often installed in out-of-the-way places like in rafters and above ceilings. If the locknut cannot be found, the connector is useless. If the electrician decides to retrieve the dropped locknut, the installation time is prolonged.

A third common problem with the present locknut connectors is the locknut is easily cross threaded onto the male thread. When this occurs, the electrician must usually use a tool to remove the locknut. On occasion, cross threading the locknut will damage the male threads on the connector making it difficult or impossible to reuse the connector. Again, the electrician must spend their time either removing the defective connector or forcing the locknut through the damaged portion of the threads.

A fourth problem with the present two-part locknut connectors is the distance the male end protrudes into the junction box. In some installations, the space inside the enclosure is already minimal. The space limitation becomes an acute problem when an additional connector is installed. The male threaded end protrudes well past the depth of the locknut and may interfere with another connector, the contents of the enclosure, or wiring inside the box. Therefore, in a limited space enclosure, the excess thread must be removed. Typically, the electrician may clip off some of the receptacle or mounting screws, or completes a combination of space enlarging modifications, all of which prolong installation time and threaten the integrity of the system as designed. A fifth common problem with the present two-part locknut connectors occurs during disassembly of the connector from the enclosure. Electricians may disassemble an installation for a variety of reasons. The disassembly of the locknut connector is more time consuming than the installation. If the locknut was installed properly, that is, by tightening it with a tool, then the locknut must be removed with a tool. Similar to the installation, if the threads are damaged during disassembly, the connector is useless. Also similar to the installation problems, if the locknut is lost, it must be replaced if the connector is to be used again. The snap-in connector presents similar problems. However, the most significant problem is that these connectors, in most cases, do not create a rigid connection. Because the snap ring is sized to accept a variety of box wall thickness, it does not rigidly attach to many boxes. The loose fit may cause electrical continuity problems, a highly dangerous situation, since the box, the conduit, and the connector are intended to be part of the electrical grounding system in some applications.

There remains an unfulfilled need to provide a generally universal connector which can be installed quickly and easily without tools, does not require access to the interior of the junction box, and does not need to be disassembled before connecting it to an electrical enclosure. Additionally, there remains an unfulfilled need to provide a generally universal connector providing a rigid; and where required by code, an electrically conductive connection; and conserves space within the enclosure.

BRIEF SUMMARY

Disclosed herein are conduit connectors and methods for making and using the same.

In an embodiment, a conduit connector can comprise: a body comprising a box engagement region capable of engaging an opening in an enclosure and a spring configured to engage the connector and the enclosure. The box engagement region can have a root surface, a leading tab, and a follower tab wherein the root surface and leading tab can be located between a leading edge and a secondary edge. A leading tab perimeter edge and a follower tab perimeter edge define a tab perimeter diameter that is larger than an opening in the enclosure. When the leading tab is inserted into the enclosure the spring can be disposed to engage the secondary edge and the enclosure.

In an embodiment, a method for connecting a connector to a enclosure comprises: angling the connector toward the opening in the enclosure, inserting the leading tab into the opening; inserting the follower tab into the opening; straightening the connector in a downward direction while pushing the box engagement region in a forward and upward direction; and placing a spring onto a body of the connector, wherein the spring engages the body and a enclosure.

BRIEF DESCRIPTION OF THE DRAWINGS

Without limiting the scope as claimed below and referring now to the drawings and figures:

FIG. 19 is an elevation view of components of an embodiment of the conduit connector with a spring separate from the body for clarity, not to scale;

FIG. 20 is an elevation view of components of an embodiment of the conduit connector with a spring, not to scale; and FIG. 21 is a frontal view of an embodiment of the conduit connector, not to scale.

DETAILED DESCRIPTION

A conduit connector is designed to quickly, safely, and rigidly connect to a junction box to facilitate the connection of a conduit to cables (and other electrical conductors) and to a wide variety of boxes (e.g., junction boxes, and so forth). Therefore, as used in this specification, the term conduit is not limited to standard rigid electrical conduit, but shall be intended to mean any type of conduit, any type of cable, or any other type of electrical conductor. The junction box is intended to include many types of electrical enclosures, such as, outlet and fixture boxes, enclosures for disconnect switches and motor starters, and transformer enclosures. The junction box can be made from steel, plastic, or other commercially feasible and acceptable materials.

Figure 1:
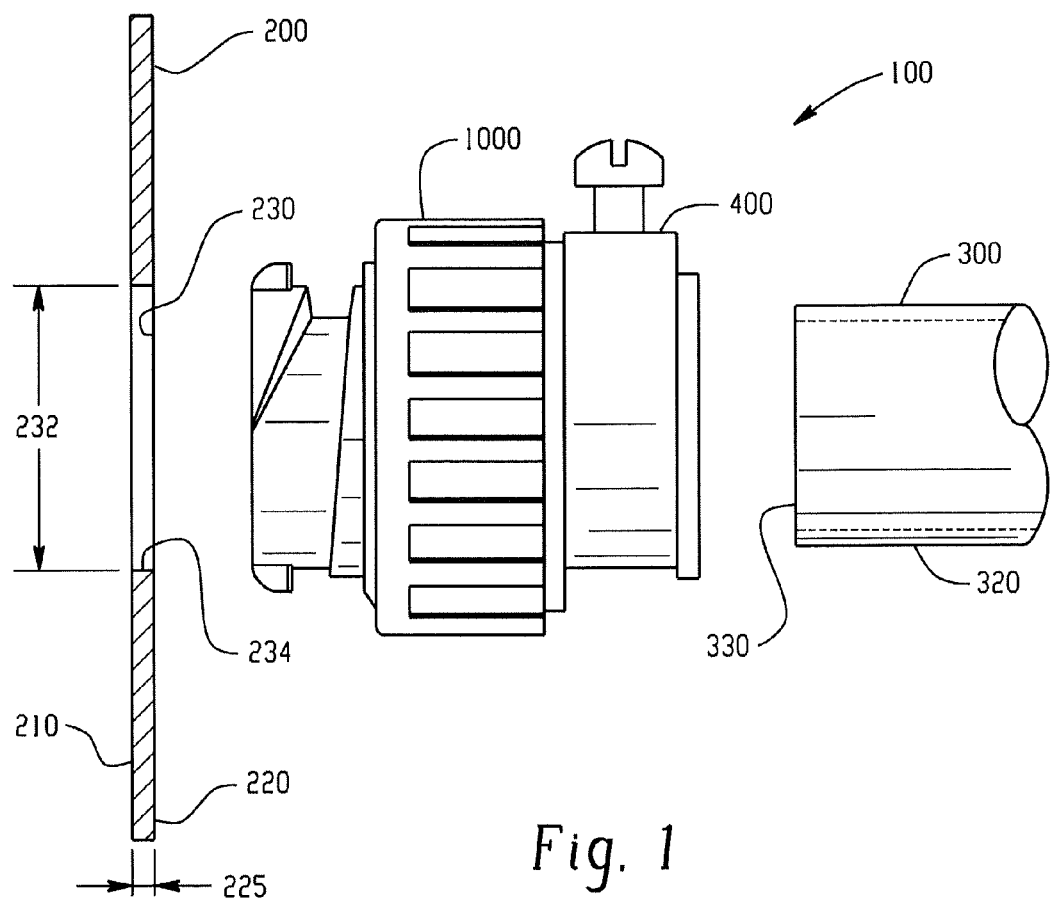
FIG. 1 is an elevation view of an embodiment of the conduit connector, not to scale.

Referring to FIG. 1, the junction box (200) has a box interior surface (210), a box exterior surface (220), and a box thickness (225). Typically, the junction box (200) has a plurality of prefabricated holes or openings each of which is covered with a plate or is formed with a thin area in the junction box (200) commonly called a knockout (230). To insert a connector to the junction box (200), the knockout (230) must be exposed by knocking out the cover piece or perforating the thin area. Alternatively, some junction boxes (200) do not have removable covers or thin areas that can be prepped to receive a connector. In this situation, knockouts (230) are cut in the desired location with a punch and die set. In either the prefabricated or on-site-cutting box design, the knockout (230) has a knockout diameter or an opening (232) and a knockout edge (234). The conduit (300) can be rigid or flexible conduit, or any type of hollow tubing commonly used in electrical installations. The conduit (300) can be made from metal (e.g., zinc, steel, aluminum, iron, and so forth), plastic (e.g., polycarbonate, polyamide) or other commercially feasible and acceptable material, or a combination comprising at least one of the foregoing. The conduit (300) has a conduit interior surface (310), a conduit exterior surface (320), a conduit thickness (340), and a conduit leading edge (330), as seen generally in FIGS. 1 and 2. The two primary components will be briefly described so the operation of the connector (100) can be explained.

The conduit connector (100) includes a body (400) and a compression nut (1000). As seen generally in FIGS. 1-3, which are merely exemplary embodiments, the body (400) has a distal end (410), a proximal end (420), a body interior surface (430), and a body exterior surface (450). The body interior surface (430) defines an inlet diameter (432) and an outlet diameter (434). The outlet diameter (434) is coaxial with the inlet diameter (432). A central axis (436) intersects the outlet and inlet diameters (434,432) midpoints. In one embodiment of the instant application, a conduit stop (438) projects from the body interior surface (430) a conduit stop projection distance (440). The conduit stop (438) limits the distance that the conduit leading edge (330) can extend into the body (400). The body (400) can be formed a variety of materials including, but not limited to, metal (e.g., zinc, steel, aluminum, iron, and so forth), plastic (e.g., polycarbonate, polyamide), or a combination comprising at least one of the foregoing, e.g., a plastic comprising metal fibers and/or particles. In addition, and depending on the type of material, the body (400) can be formed employing various techniques such as cast, pressed, machined from stock, injection molded, or manufactured by other processes utilized for manufacturing electrical connectors. Furthermore, the body (400) can have three regions: namely, a box engagement region (500), an optional nut engagement region (800), and a conduit engagement region (900).

Figure 3:
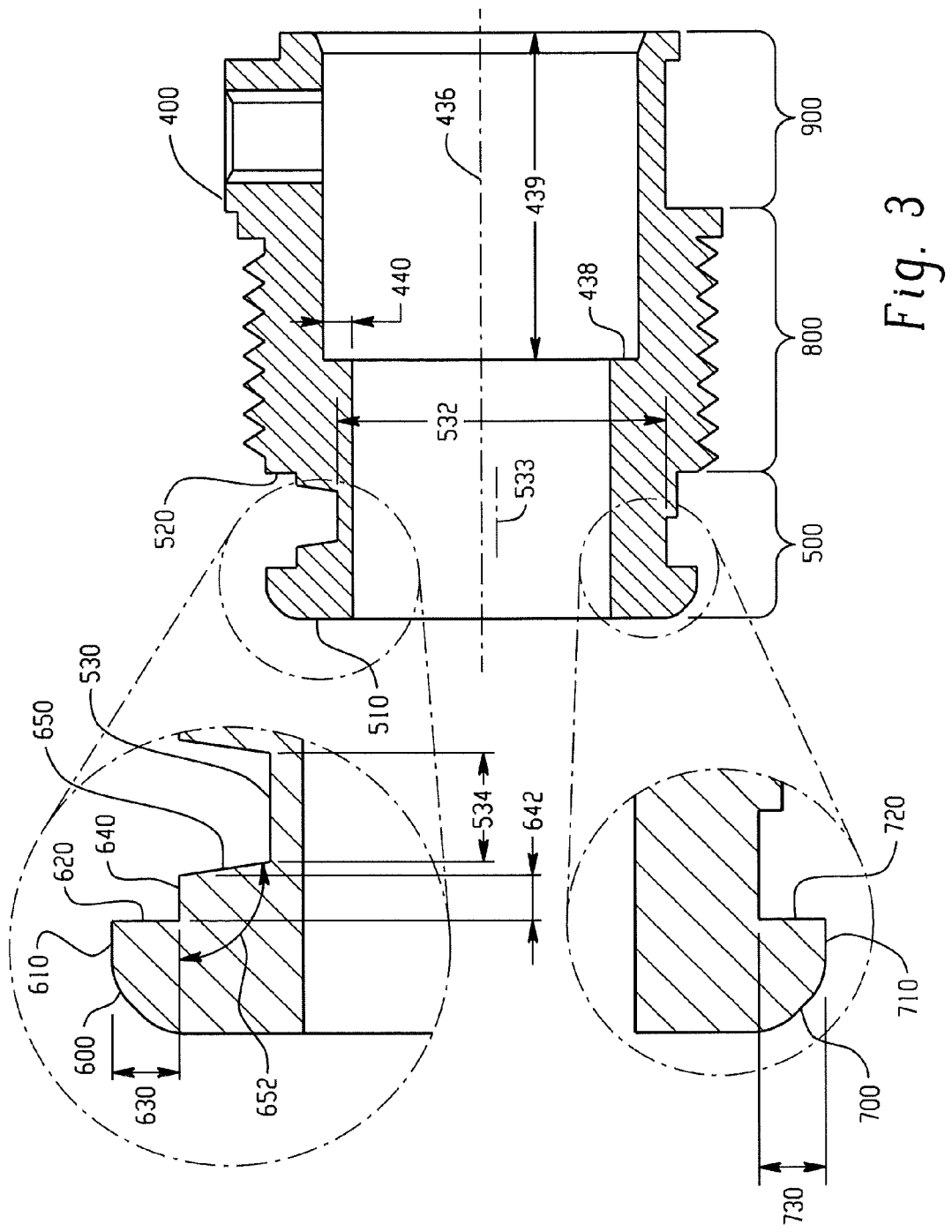
FIG. 3 is a cross-sectional view of components of an embodiment of the conduit connector, not to scale, with exploded views of both a leading tab and a follower tab.

The box engagement region (500) is positioned at the distal end (410) of the body (400) and cooperates with the knockout (230) to attach the body (400) to the junction box (200). The box engagement region (500) has a leading edge (510), a secondary edge (520), a root surface (530), a leading tab (600) and a follower tab (700). The leading tab (600) and the follower tab (700) are located between the leading edge (510) and the secondary edge (520) and extend radially outward. The leading tab (600), the root surface (530), and the follower tab (700) will be described more below. The leading tab (600) has a leading tab perimeter edge (610), a leading tab primary contact surface (620), a leading tab centering ledge (640), and a leading tab centering flank (650), as seen in FIG. 3. The leading tab (700) extends radially a leading tab height (630) from leading edge (510). The leading tab centering flank (650) extends from the root surface (530) to the leading tab centering ledge (640). A flank angle (652) exists between the leading tab centering flank (650) and the leading tab centering ledge (640). The leading tab centering ledge (640) has a ledge width (642) which is the maximum width of the leading tab centering ledge (640) as measured from the intersection of the leading tab centering ledge (640) with the leading tab centering flank (650) and the intersection of the leading tab centering ledge (640) and the leading tab primary contact surface (620). The flank angle (652) can be approximately ninety-one degrees to approximately one hundred and seventy-nine degrees (specifically, about one hundred degrees to about one hundred fifty degrees, and more specifically, about one hundred twenty degrees to about one hundred forty degrees). The functioning of the leading tab centering ledge (640), the leading tab centering flank (650) oriented at the flank angle (652) imparts a desired self-centering feature of the body (400) in the knockout (230) and eases assembly. In one embodiment, the distance from leading tab primary contact surface (620) to the body distal end (410) is greater than 150% of the box thickness (225), and the ledge width (642) is substantially equal to or less than the box thickness (225). This relationship provides a minimum protrusion into the interior of the box (200) while simultaneously enhancing the structural strength of the tabs (600,700) and the centering of the body (400) in the knockout (230).

Figure 22:
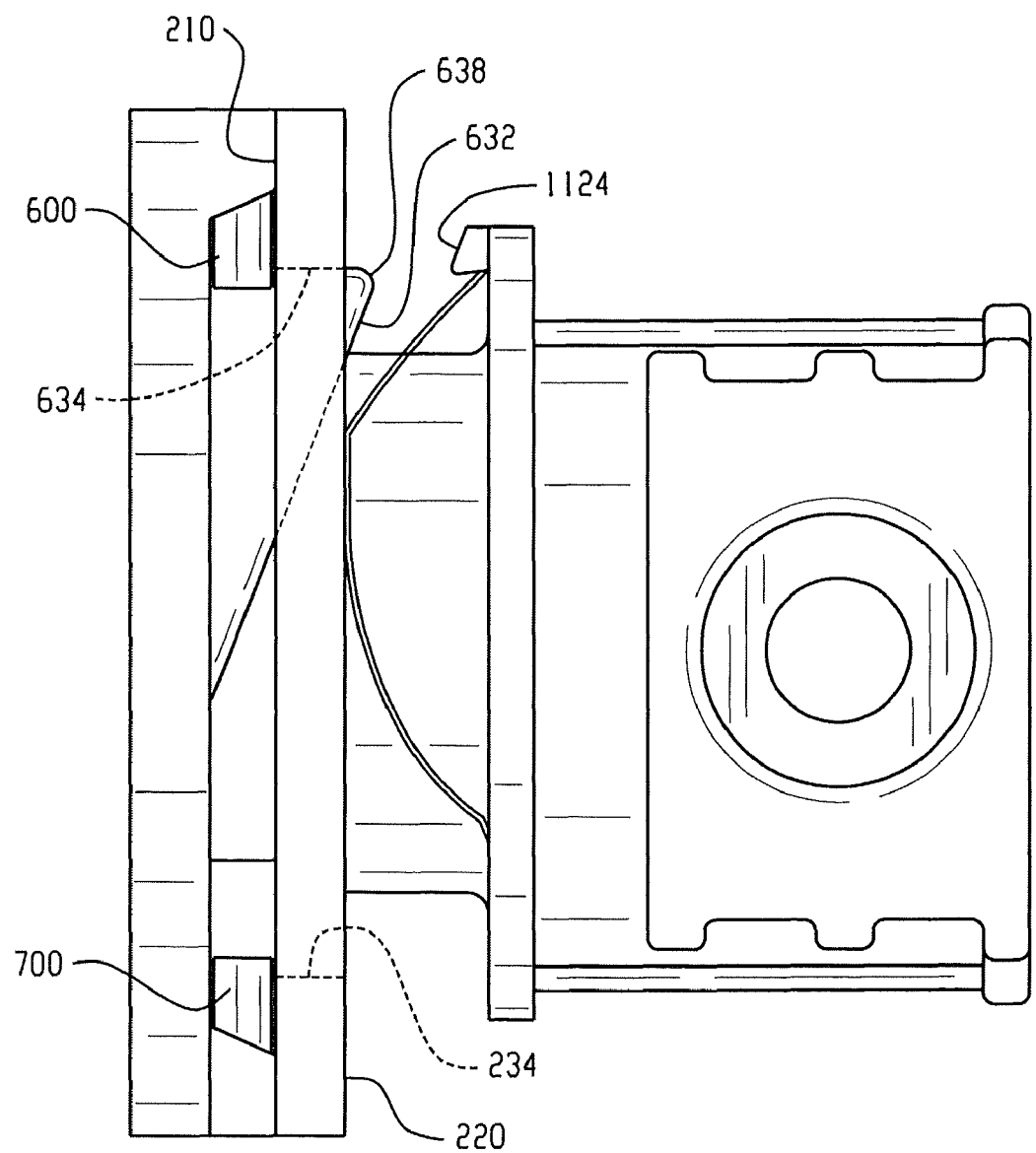
FIG. 22 is a partial side view of an embodiment of the conduit connector engaging and enclosure, and comprising the spring and the engagement element.

In some designs, the leading tab centering ledge (640) can form a projection or lug (see reference 638, FIG. 22). The lug can project from the leading tab primary contact surface (620) toward the secondary edge (520) such that, when the connector is connected to an enclosure (e.g., through a hole in a wall of the enclosure), the leading tab primary contact surface (620) contacts the box interior surface (210), while the leading tab centering ledge (640) exerts lateral pressure on the wall of the knockout edge (234). Optionally, the leading tab centering ledge (640) can have a sufficient length to protrude out of the knockout (230) toward the body (400) (e.g., the lug can have a length that is greater than or equal to the thickness of the wall (234) from interior surface (210) to the exterior surface (220)). The engagement element (632) can have an upper portion (634) that extends substantially perpendicularly from the leading tab primary contact surface (620). This upper portion (634) can physically contact and, desirably, can exert lateral pressure on the knock out edge (234) to further retain the connector in the knockout. The engagement element (632) can also have various geometries that enable the desired engagement with the knockout edge, such as polygonal (e.g., square, rectangular, triangular, and so forth), and/or a rounded geometry. Illustrated in FIG. 22 is a generally triangular geometry with a rounded edge. The engagement element (e.g., lug) can inhibit the connector from accidentally becoming dislodged from the hole in the enclosure (e.g., the knockout (230) in the box (200)). Alternatively, or in addition, other engagement element(s) can be employed to enhance the retention of the connector in the enclosure and inhibit unintentional removal; e.g., to inhibit accidental dislodging of the connector due to bumping, vibrations, and so forth.

The root surface (530) defines a root surface diameter (532) having a root surface central axis (533) that is offset from the central axis (436), as seen in FIG. 3. In an embodiment, the root surface (530) a minimum root surface width (534) which is defined as a distance from the box engagement region secondary edge (520) to the nearest intersection of the root surface (530) and the leading tab centering flank (650). The functioning of the root surface (530) during assembly will be described in greater detail below.

Figure 2:
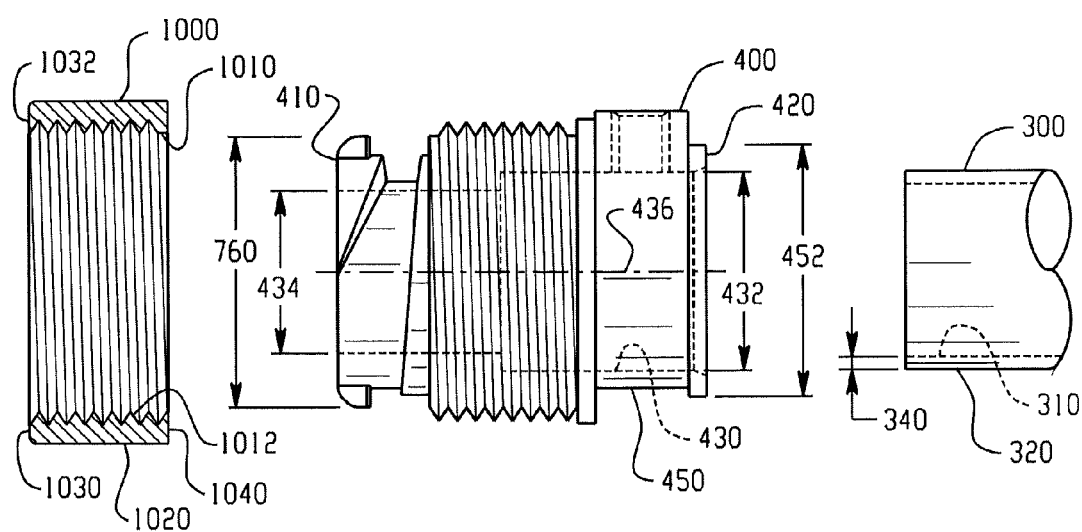
FIG. 2 is an elevation view of components of an embodiment of the conduit connector, not to scale, showing a compression nut separated from a body for clarity.
Figure 15:
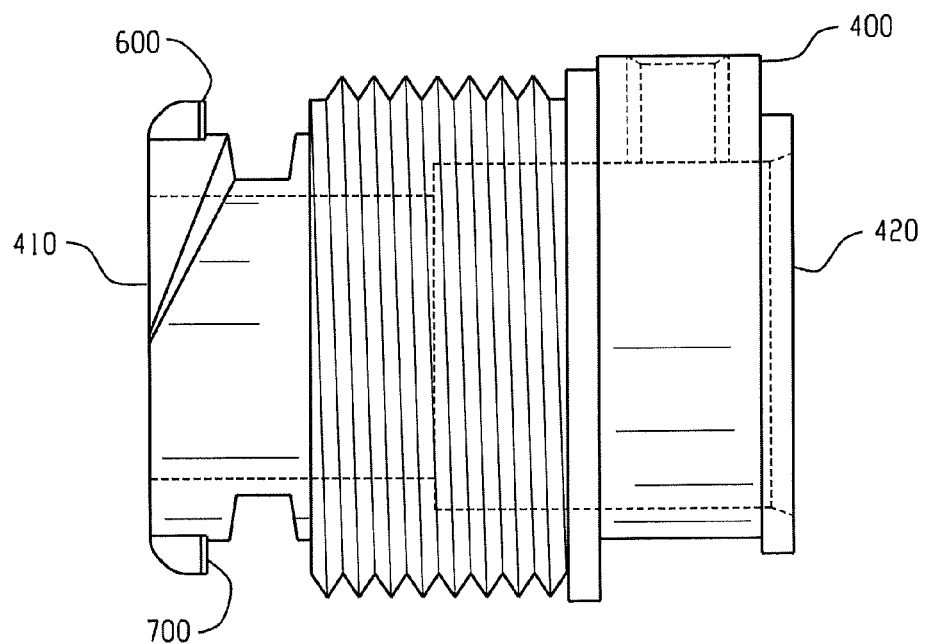
FIG. 15 is an elevation view of components of an embodiment of the conduit connector, not to scale.
Figure 16:
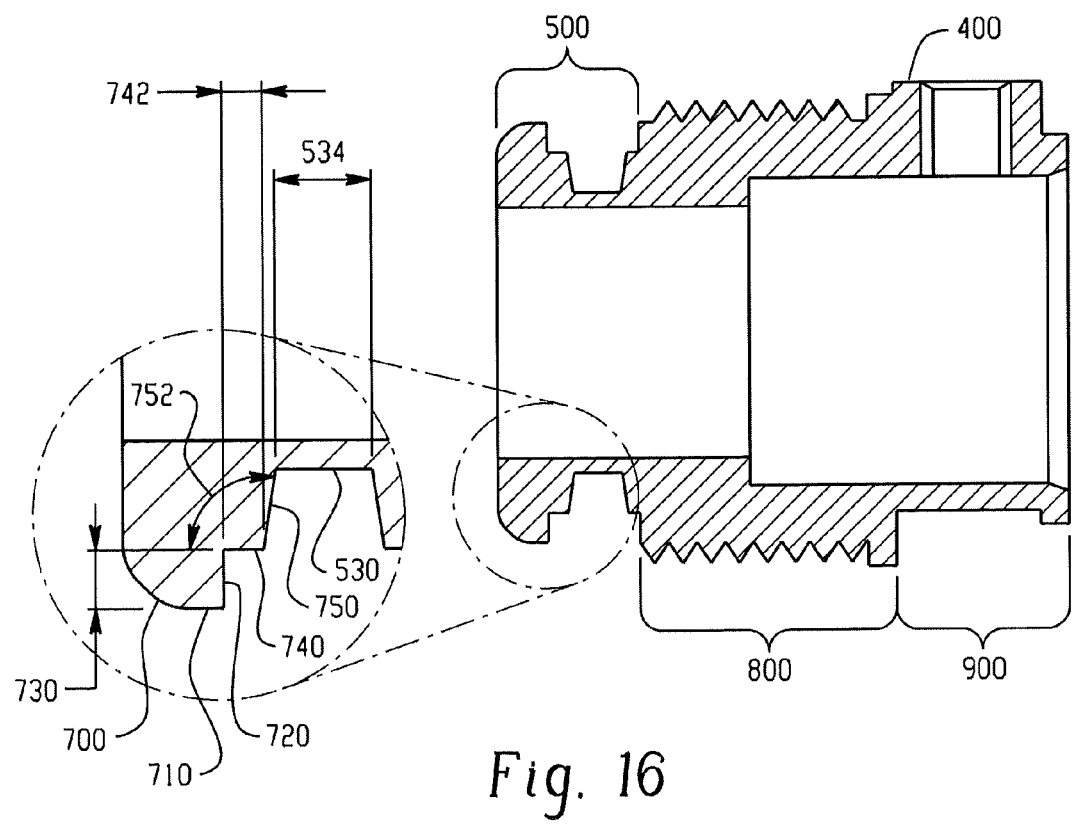
FIG. 16 is a cross-sectional view of components of an embodiment of the conduit connector, not to scale.

With continued reference to FIG. 3, the follower tab (700) also has a perimeter edge (710) and a primary contact surface (720). The leading tab (700) extends radially a leading tab height (730) from the box engagement region leading edge (510). The leading tab perimeter edge (610) and the follower tab perimeter edge (710) form a tab perimeter diameter (760), as shown in FIG. 2. The tab perimeter diameter (760) is larger than the knockout diameter (232) to permit the body (400) to be secured to the junction box (200). In another embodiment the follower tab (700) has a follower tab centering ledge (740) and a follower tab centering flank (750) which extends from the root surface (530) to the follower tab centering ledge (740), as seen in FIGS. 15 and 16. A follower tab flank angle (752) exists between the follower tab centering flank (750) and the follower tab centering ledge (740). The follower tab centering ledge (740) has a follower tab ledge width (742) which is the maximum width of the follower tab centering ledge (740) as measured from the intersection of the follower tab centering ledge (740) with the follower tab centering flank (750) and the intersection of the follower tab centering ledge (740) and the follower tab primary contact surface (720). The follower tab flank angle (752) can be approximately ninety-one degrees to approximately one hundred and seventy-nine degrees (specifically, about one hundred degrees to about one hundred fifty degrees, and more specifically, about one hundred twenty degrees to about one hundred forty degrees).

Figure 4:
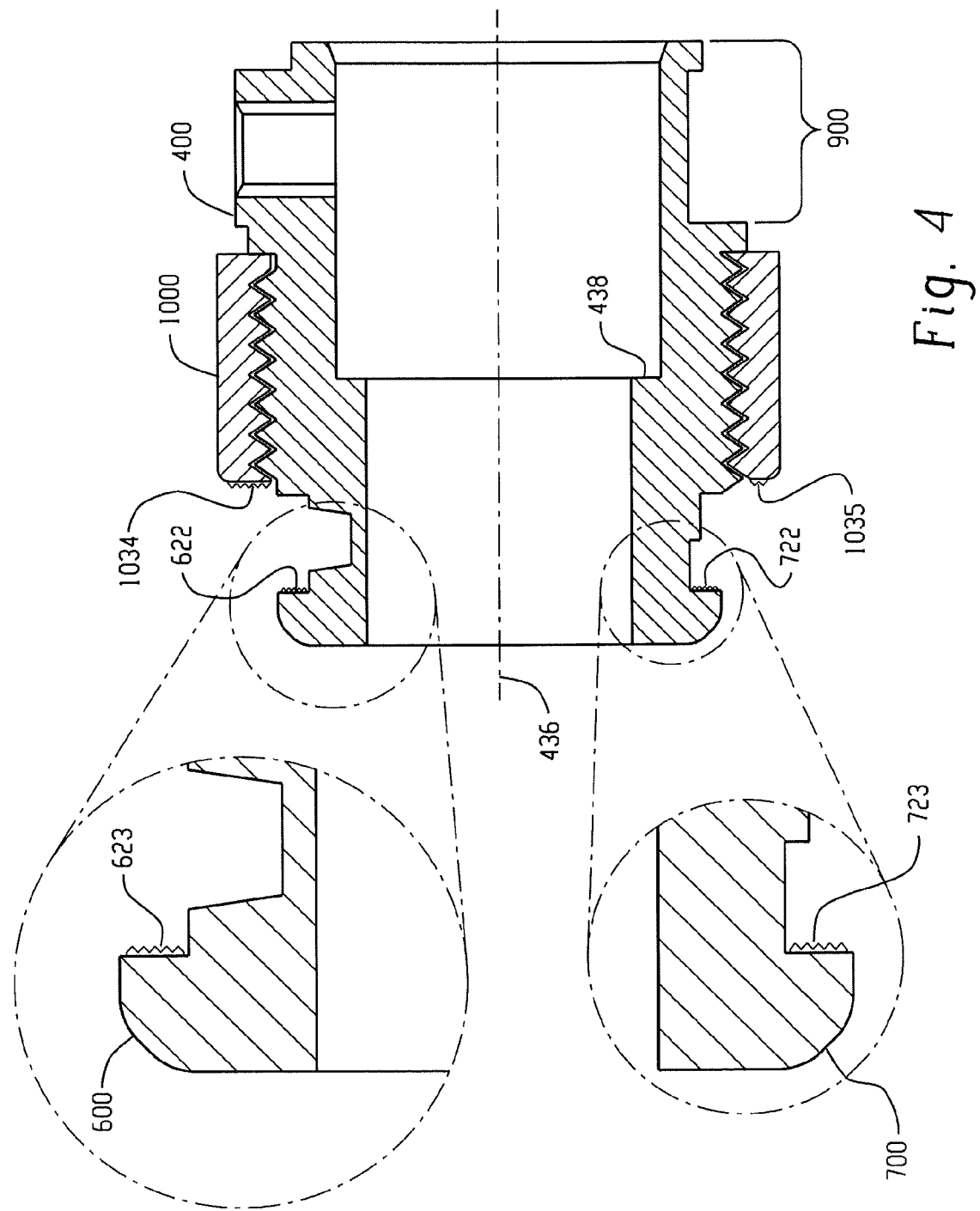
FIG. 4 is a cross-sectional view of components of an embodiment of the conduit connector, not to scale, with exploded views of both a leading tab and a follower tab.

In an embodiment, as seen in FIG. 4, the leading and follower tab primary contact surfaces (620,720) have grip enhancing features (622,722). The grip enhancing features (622,722) reduce the relative motion between the leading and follower tab primary contact surfaces (620,720) and the box interior surface (210). By way of example only, the grip enhancing features (620,720) can be adhesive, a pressure sensitive adhesive that is activated by removal of a releasable covering, or a rubber-like gasket or o-ring. By improving the interfacial resistance to motion, the body (400) is substantially prevented from rotating thereby improving the resistance of the connector (100) to vibration.

In another embodiment, the grip enhancing features (622, 722) are gripping projections (623,723), as seen in the exploded views in FIG. 4. The grip projections can be knurling, checkering, knobs, teeth, texturing of the surface, a plurality of surface features, as well as combinations comprising at least one of the foregoing, that come into contact with the box interior surface (210) and increase the frictional forces between the leading and follower tabs (600,700) and the box interior surface (210) substantially preventing rotation of the body (400).

Figure 5:
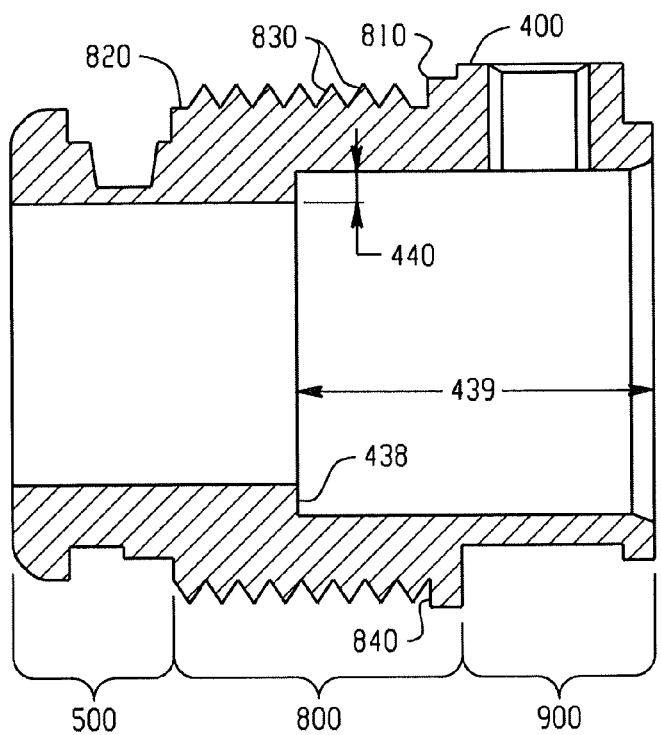
FIG. 5 is a cross-sectional view of components of an embodiment of the conduit connector, not to scale.

In an embodiment, the body (400) has two radially extending tabs, that is, the leading tab (600) and the follower tab (700). However, those skilled in the art will observe and appreciate that a lone leading tab (600) may operate with the root surface (530), or multiple leading tabs (600) in combination with a plurality of follower tabs (700) in operation with the root surface (530) where the tabs (600,700) are positioned in a generally opposing manner will also provide the inventive assembly system. FIG. 5 shows the nut engagement region (800), which has a nut engagement region proximal end (810), a nut engagement region distal end (820), and a plurality of nut engagement region threads (830). The nut engagement region (800) cooperates with the compression nut (1000). In an embodiment, the nut engagement region (800) is formed with a nut stop (840). The nut stop (840) is positioned at the nut engagement region proximal end (810) adjacent to the conduit engagement region (900). The nut stop (840) facilitates the assembly of the connector (100) at the factory and removal of the connector (100) from the junction box (200) by preventing the compression nut (1000) from being rotated off the body proximal end (420).

Figure 6:
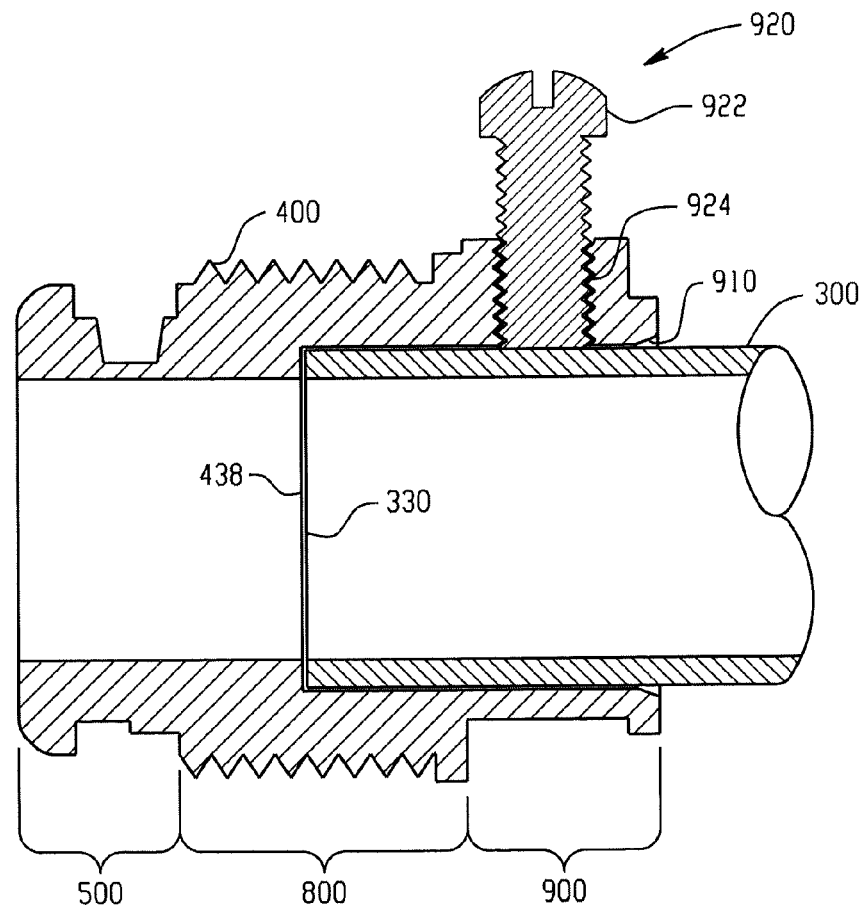
FIG. 6 is a cross-sectional view of components of an embodiment of the conduit connector, not to scale, illustrating a conduit compression system.

In one embodiment, the conduit engagement region (900) has a conduit compression system (920) for frictionally securing the conduit (300) within the body (400), as seen in FIG. 6. In an embodiment the conduit compression system (920) is a setscrew (922) and a setscrew receiver (924). The setscrew receiver (924) is formed in the conduit engagement region (900) and extends from the body interior surface (430) to the body exterior surface (450). The setscrew (922) is threaded through the setscrew receiver (924). When the conduit (300) is inserted into the body (400) past the setscrew (922) to the conduit stop (438), the setscrew (922) is rotated into engagement with the conduit exterior surface (320) thereby securing the conduit (300) in position. As one skilled in the art would appreciate, the conduit can be secured within the body (400) other than by frictional means, by way of example and not limitation, the solvent welding of suitable materials. A conduit inlet chamfer (910) can be formed in the conduit engagement region (900) to ease initial insertion of the conduit (300) into the body proximal end (420). In an embodiment, the body exterior surface (450) at the conduit engagement region (900) defines a body exterior surface inlet diameter (452), as seen in FIG. 2, and the root surface diameter (532) is less than the body exterior surface inlet diameter (452).

Figure 12:
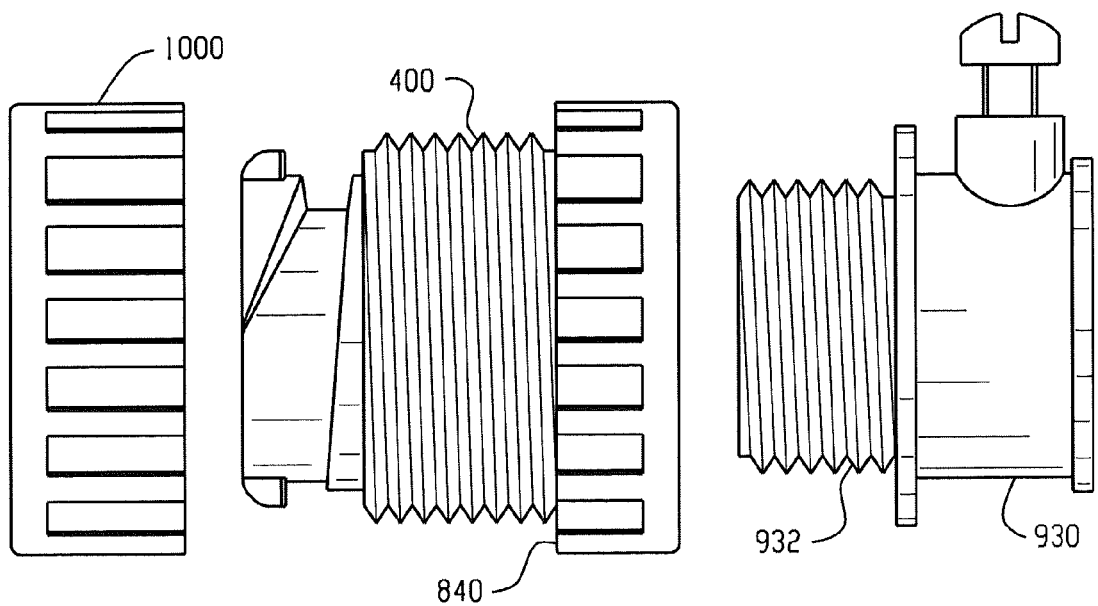
FIG. 12 is an elevation view of components of an embodiment of the conduit connector, not to scale.
Figure 13:
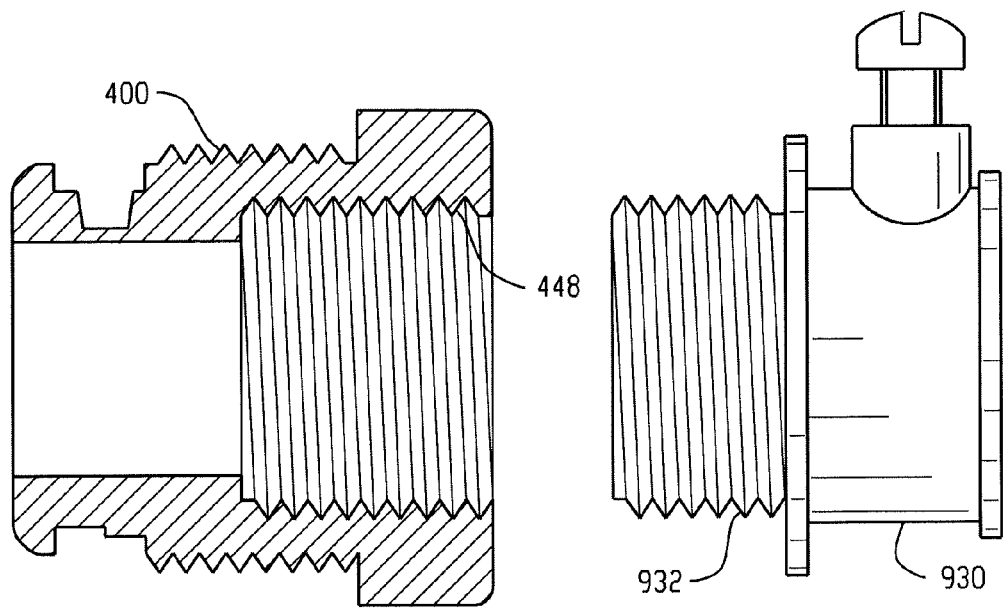
FIG. 13 is a cross-sectional view of components of an embodiment of the conduit connector with a removable conduit engagement region, not to scale.
Figure 14:
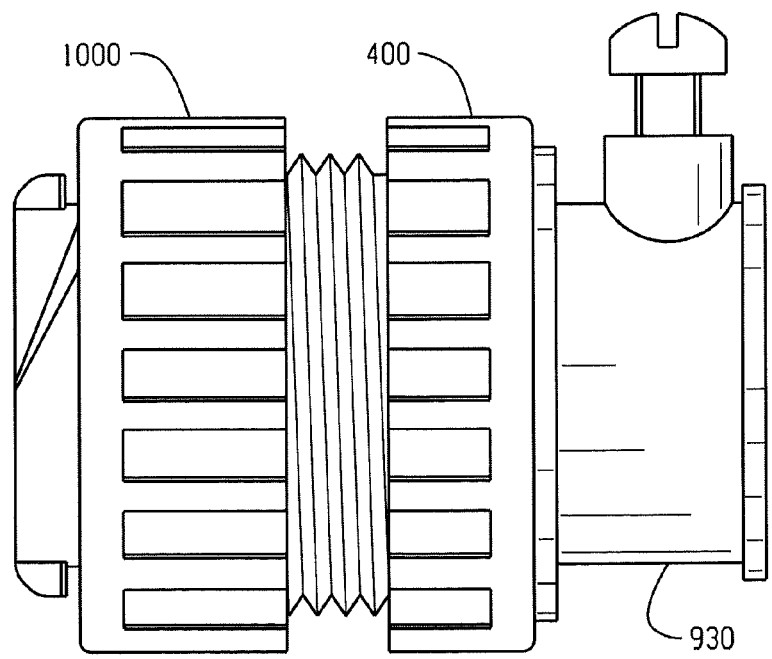
FIG. 14 is an elevation view of components of an embodiment of the conduit connector with a removable conduit engagement region, not to scale.

FIGS. 12-14 illustrate an embodiment where the conduit engagement region is a removable conduit engagement region (930). As shown in FIGS. 12 and 13, the removable conduit engagement region (930) has a threaded connector (932) for cooperating with the body interior surface (430) having a plurality of internal body threads (448). FIG. 14 illustrates the removable conduit engagement region (930) threaded into the body (400). In this embodiment, the removable engagement region (930) can be a commercially available electrical connector without the locknut. The body (400) can be formed with the internal body threads (448) that are sized to cooperate with the male threaded end of a typical electrical connector.

As mentioned above, the conduit connector (100) can have an optional compression nut (1000) and associated features. With reference to FIGS. 1 and 2, the compression nut (1000), which is shown separate from the body (400), has an exterior surface (1020) and a nut interior surface (1010) having a plurality of nut threads (1012) that cooperate with the nut engagement region threads (830). The nut exterior surface (1020) can be formed with texturing to facilitate operation manually or formed with features for cooperating with tools. The compression nut (1000) has a nut free edge (1040) that can physically contact the nut stop (840). The nut stop (840), as shown in FIG. 5, prevents the compression nut (1000) from being rotated off the nut engagement region proximal end (810) during assembly following manufacturing or during disassembly of the connector (100) from an electrical installation, thus preventing loss of the compression nut (1000). It is appreciated that the location of the compression nut (1000) on the body (400) is for utilizing the application in electrical installations. In this design, the user does not need to remove the compression nut (1000) prior to installation. Additionally, the compression nut (1000) is easily maneuvered against the box exterior surface (220) without the user placing their hand inside the junction box (200). The compression nut (1000) also has a nut contact edge (1030) having a nut contact surface (1032) for engaging the box exterior surface (220). In an embodiment, with reference to FIG. 4, the compression nut contact surface (1032) has a grip enhancing feature (1034) to reduce the relative motion between the compression nut (1000) and the box exterior surface (220) while in contact with one another. By way of example only, the grip enhancing feature can be adhesive, a pressure sensitive adhesive that is activated by removal of a releasable covering, or a rubber-like gasket or o-ring. By increasing the frictional forces, the compression nut (1000) is substantially prevented from unintentionally rotating thereby improving the resistance of the connector (100) to vibration. Vibration occurs in many applications, but is especially problematic in industrial environments, where it causes threaded fittings to loosen over time. In another embodiment, the grip enhancing feature (1034) is a gripping projection (1035), as shown in FIG. 4. The gripping projection (1035) can comprise knurling, knob(s), checkering, teeth, texturing of the surface, or a plurality of surface features that come into contact with the box exterior surface (220), and any combination comprising at least one of the foregoing. The gripping projection (1035) increases the frictional forces between compression nut (1000) and the box exterior surface (220) substantially preventing unintentional rotation of the compression nut (1000).

The orientation of the various elements of the connector (100) imparts the desired functionality of the connector (100). The installation of the connector (100) is illustrated in FIGS. 7-11.

Figure 7:
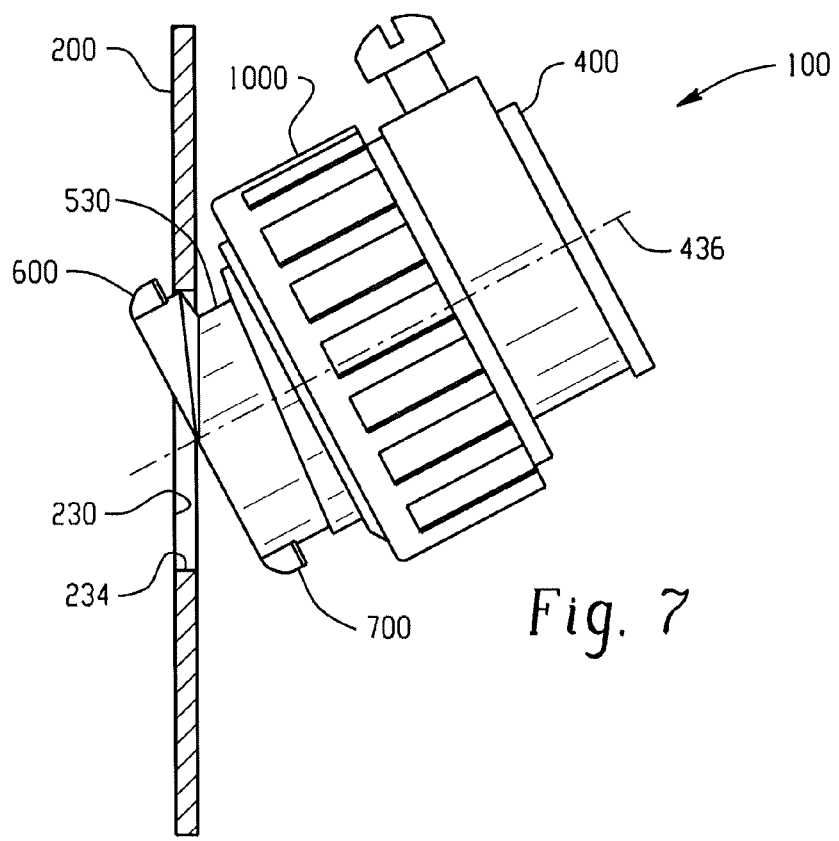
FIG. 7 is an elevation view of components of an embodiment of the conduit connector, not to scale, illustrating a first step in the insertion of a body into a junction box.
Figure 8:
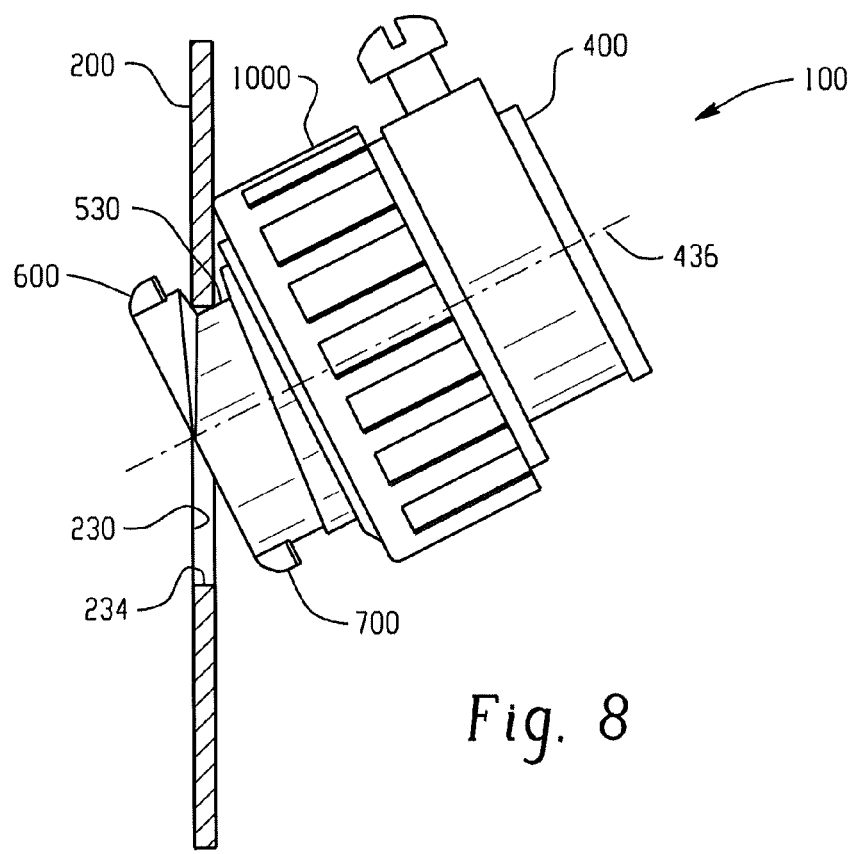
FIG. 8 is an elevation view of components of an embodiment of the conduit connector, not to scale, illustrating a further step in the insertion of a body into a junction box.
Figure 9:
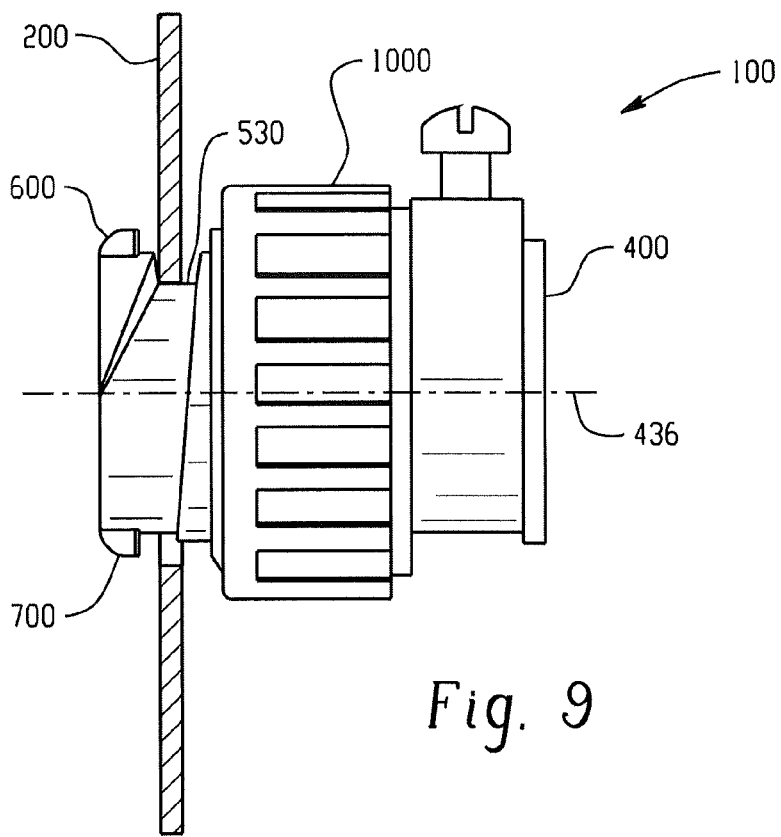
FIG. 9 is an elevation view of components of an embodiment of the conduit connector, not to scale, illustrating yet a further step in the insertion of a body into a junction box.

The design of the conduit connector (100) allows the installation of the conduit (300) with the junction box (200) for running electrical wiring and the like to proceed quickly and easily, and therefore at substantial labor cost savings, versus other connector designs. FIG. 7 illustrates that once the knockout (230) is exposed or created, the leading tab (600) can be inserted from the outside of the junction box (200) into the knockout (230) by angling the body (400) such that the central axis (436) is not orthogonal to the knockout (230). Once the leading tab (600) is on the inside of the junction box (200), the knockout edge (234) is brought into contact with the root surface (530), as shown in FIG. 8. The central axis (436) is then reoriented orthogonally to the knockout (230) while holding the knockout edge (234) in contact with the root surface (530), as shown in FIG. 9. In an embodiment, the root surface central axis (533) is offset from the central axis (436) toward the follower tab (700) by a sufficient amount (e.g., greater than or equal to 8%) to accommodate a larger variation in standard knockout diameters thereby providing for easier installation. During reorientation of the body (400), the follower tab (700) passes through the knockout (230) into the junction box (200). At this point, both the leading and follower tabs (600, 700) are on the inside of the junction box (200).

Figure 10:
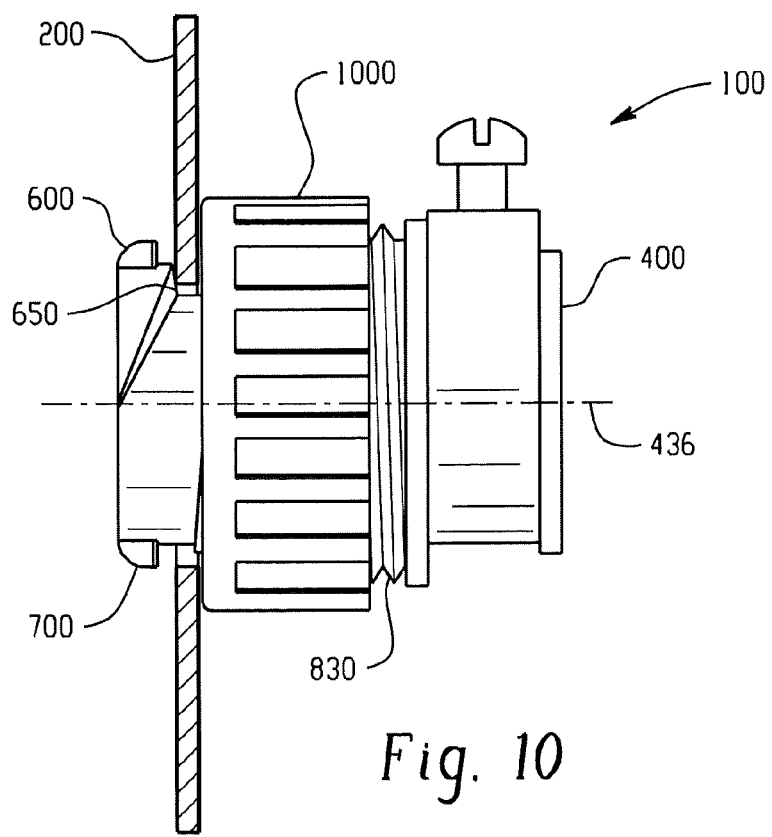
FIG. 10 is an elevation view of components of an embodiment of the conduit connector, not to scale, illustrating even yet a further step in the insertion of a body into a junction box.
Figure 11:
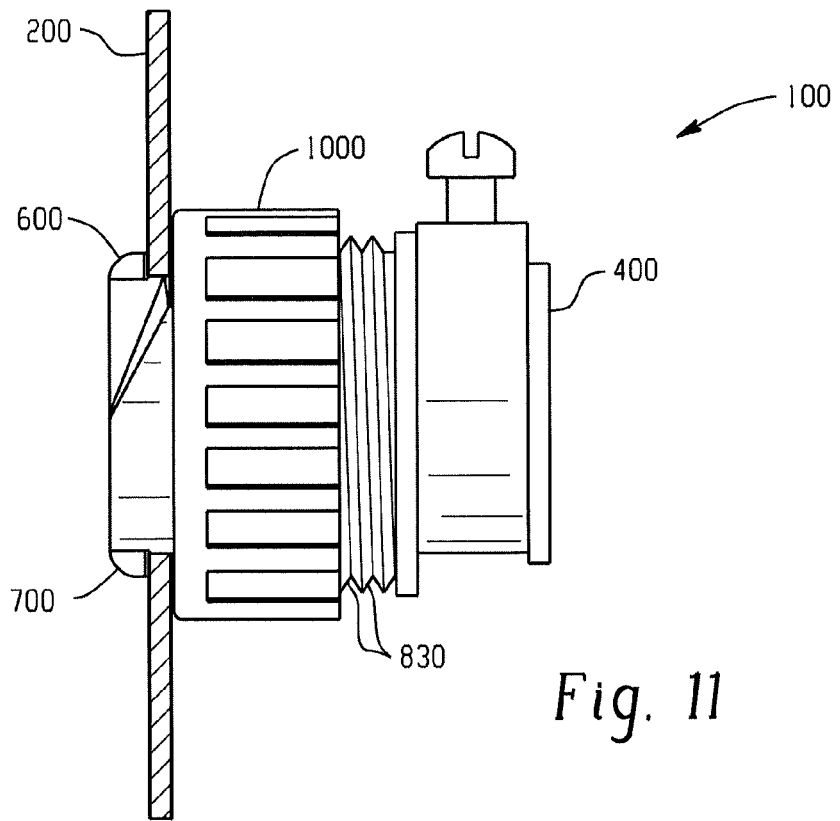
FIG. 11 is an elevation view of components of an embodiment of the conduit connector, not to scale, illustrating a final step in the insertion of a body into a junction box.
Figure 17:
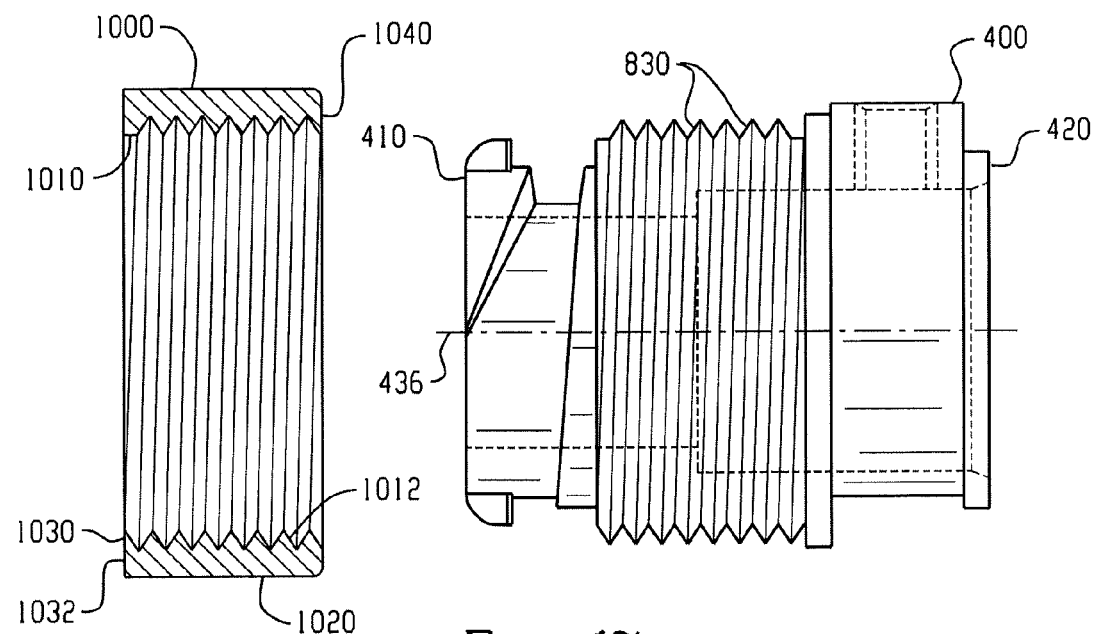
FIG. 17 is an elevation view of components of an embodiment of the conduit connector with left-handed threads, not to scale.

The body (400) is drawn tight to the junction box (200), as seen in FIG. 10, by rotating the compression nut (1000) so the nut contact edge (1030) presses against the box exterior surface (220). By continuing to rotate the compression nut (1000), the nut contact edge (1030) forces the knockout edge (234) onto the leading tab centering flank (650). Further rotation of the compression nut (1000) pushes the knockout edge (234) onto the leading tab centering ledge (640), substantially centering the body (400) in the knockout (230), as seen in FIG. 11. Since the tab perimeter diameter (760) is greater than the knockout diameter (232), when the body (400) moves orthogonally away from the junction box (200), the leading tab and follower tab primary contact surfaces (620, 720) engage the box interior surface (210). Additional rotation of the compression nut (1000) compresses the junction box (200) between the compression nut contact surface (1032) and the leading and follower tab primary contact surfaces (620, 720). Actual tightening can be accomplished by manual manipulation or by application of tools to the nut exterior surface (1020). In an embodiment, as seen in FIG. 17, the compression nut (1000) is rotated in the counter-clockwise direction to tighten the compression nut (1000) against the junction box exterior surface (220), that is, the nut threads (1012) advance to the left, commonly referred to as left-handed threads. The left-handed threaded design of the nut engagement region threads (830) and the compression nut threads (1012) is useful for maintaining a tight connection to junction boxes installed on equipment which have clockwise rotational motion.

Previously, a locknut required a great degree of tactility to hold and to thread onto the male threaded connector, the difficulty of which is accentuated and prolonged when wearing gloves. So, even in frigid temperatures, to reduce the installation time, electricians generally do not wear gloves to protect their hands. Unlike the two-part locknut or snap-in connectors, by reversing the above installation procedure, the body (400) can be easily removed from the junction box (200) and then later reused. Most importantly, however, the compression nut (1000) remains attached to the body (400). In other words, there is no need to remove the compression nut (1000) to disconnect the body (400) from the junction box (200). The body (400) and the compression nut (1000) remain an integral unit through any number of connections and disconnections. The connector (100) may also be easily installed while wearing gloves because the removable locknut is absent. Additionally, the connector (100) does not require access to the interior of the junction box (200) to rigidly connect the conduit (300). All connections between the conduit and the junction box (200) can proceed without opening or removing the cover of the junction box (200).

Referring now to FIG. 19, alternatively or in addition to the compression nut (1000), a spring (1100) can be employed. The spring (e.g., a leaf spring) (1100) is configured to engage the conduit (300) and the junction box (not shown), e.g., the secondary edge (520) of the connector 100 and the outer surface of the junction box, to compress the leading and following tabs against an inner surface of the junction box. The spring comprises a general geometry enabling it to mate with the connector (100) (while the leading and following tabs (600, 700) engage an interior wall of a junction box) and the junction box. The geometry can be generally "U" shaped with a convex/concave mid-portion (1108) such that the spring curves outward from both the top end (1110) and the bottom end (1112) toward the mid-portion (1108); it is bowed (e.g., arched).

The spring further comprises a top end (1110) and a bottom end (1112). In an embodiment, the spring can comprise a notch (1102) located at the top end (1110) configured to engage with a projection (1104) on the body (400) at the secondary edge (520), e.g., to facilitate proper alignment of the spring, facilitate installation of the spring, and/or to enhance retention of the spring as desired. The spring (1100) further comprises angled lip(s) (1116) located at the bottom end (1112) configured to engage the secondary edge (520).

FIG. 20 illustrates a completed assembly of the conduit connector (100) and the spring (1100). The mating of the notch (1102) located at the top end (1110) of the spring (1100) and the projection (1104) located on the body (400) aids in stabilizing and securing the spring (1100) on the box engagement region (500) prior to connection to the junction box (200). The projection can protrude from the body (400) at any appropriate angle to attain the desired securing and stabilizing. For example, the projection (1104) can form a substantially 90° angle with the secondary edge (520), or the projection (1124; (see FIG. 22)) can form a less than 90° angle with the secondary edge (520), projecting down toward the root surface (530) (e.g., forming an angle of 35° to 75°). The spring (1100) may comprise a resilient material such as metals (e.g., zinc, steel, aluminum, iron, bronze, beryllium, copper and so forth), plastic and/or any other material with a spring/memory quality, or a combination comprising at least one of the foregoing, such as spring steel.

In one embodiment, the spring (1100) is placed on the box engagement region (500) of the conduit (300) and engages both the connector (100) and the opening (232) in the junction box (200). The connector (100) can be angled toward the opening (232) in the junction box (200) such that the spring (1100) is engaged with the opening (232) in the junction box (200) by straightening the connector (100) in a downward direction while simultaneously pushing the box engagement region (500) in a forward and upward direction. The spring (1100) does not enter the opening (232) in the junction box (200), but rather remains on the outside of the opening before and after installation. The spring (1100) secures the connector (100) to the opening (232) in the junction box (200) and prevents the connector (100) from releasing from the opening (232) after the connector (100) has been straightened. The use of this spring renders the use of a compression nut optional, since the spring (1100) forms the desired compressive force, retaining the connector in place.

The distal end (410) of the connector (100) contains a throat section (1114). In one embodiment as illustrated in FIG. 21, the throat section (1114) can be a rectangular shape, but any other commercially feasible and acceptable shape can also be used. The body (400) of the conduit (300) contains a smooth transition from the rounded or other shape at the proximal end (420) of the body (400) to the throat section (1114) to assist the wires passing through and to prevent chafing or cutting of the wires. The connector (100) can further contain a gasket or sealing ring when a liquid tight seal is desired. The connector (100) can have a smooth, rounded surface for the gasket or sealing ring to attach. The connector (100) can be made in any configuration, including, straight, 45 degree, 90 degree, or any other degree.

Figure 18:
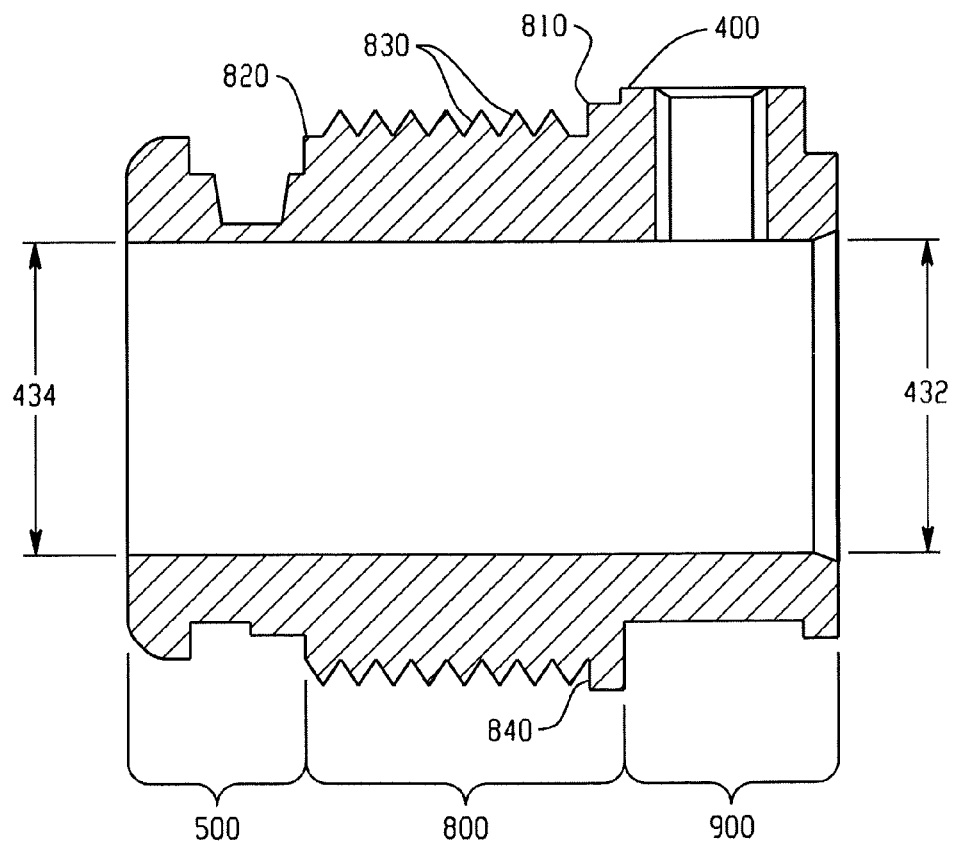
FIG. 18 is a cross-sectional view of components of an embodiment of the conduit connector, not to scale.

Once the connector (100) is secured to the junction box (200) through the knockout (230), the conduit (300) is attached to the body (400). In an embodiment of the instant application, as seen in FIG. 6, the conduit (300) is attached to the body (400) by inserting the conduit leading edge (330) to the conduit stop (438). The conduit compression system (920) fractionally secures the conduit (300) to the body (400). A plurality of electrical wires or cables is passed through the conduit (300), through the body interior surface (430), and into the junction box (200). However, in an embodiment as seen in FIG. 18, without the conduit stop (438), that is, when the inlet diameter (432) and the outlet diameter (434) are substantially the same and therefore there is no conduit stop projection distance (440) to be reasonably measured, the conduit (300) can be inserted through the body (400) into the junction box (200), or at least inserted through the body (400) to an adequate depth to assure a firm grip by the conduit engagement region (900) on the conduit (300) or cable. This embodiment can be suitable for passing flexible cable, portable cord and the like into the junction box (200).

The conduit connector can be used in a variety of fashions including, connectors for metallic conduits, non metallic flexible conduits, armored cables, metal clad (MC) cables, non-metallic sheathed cables, flexible metal conduits, cord grip/strain relief/cable gland connectors, etc. This conduit connector (100) succeeds in reducing cost by saving time and labor during both manufacturing and installation. The connector (100) also occupies minimal space inside the connector, reducing or eliminating interference problems that may occur with standard locknut connectors (e.g., when the installer must to shorten the device mounting screws). The conduit connector (100) further increases safety, as no fingers or tools touch the inside of the connector (100), where hot, energized areas are located.

Additionally, although the spring (1100) has been described in relation to conduit connector (100), it can be employed with various conduit connectors which can optionally comprise the projection (1104). These conduit connectors will have a region for receiving the spring, and enabling the spring to form a pressure fit between the box and the conduit connector, when in use.

In an embodiment, the conduit connector (100) can comprise: a body (400) comprising a box engagement region (500) capable of engaging an opening (232) in a junction box (200) and a spring (1100) configured to engage the connector (100) and the junction box (200). The box engagement region (500) can have a root surface (530), a leading tab (600), and a follower tab (700) wherein the root surface (530) and leading tab (600) can be located between a leading edge (510) and a secondary edge (520). A leading tab perimeter edge (610) and a follower tab perimeter edge (710) define a tab perimeter diameter (760) that is larger than an opening (232) in the junction box (200). When the leading tab (600) is inserted into the junction box (200) the spring (1100) can be disposed to engage the secondary edge (520) and the junction box (200).

In an embodiment, a method for connecting a connector (100) to a junction box (200) comprises: angling the connector (100) toward the opening in the junction box (200), inserting the leading tab (600) into the opening (232); inserting the follower tab (700) into the opening (232); straightening the connector (100) in a downward direction while pushing the box engagement region (500) in a forward and upward direction; and placing a spring (1100) onto a body (400) of the connector (100), wherein the spring (1100) engages the body (400) and a junction box (200). The connector (100) can comprise the body (400) comprising a box engagement region (500) capable of engaging an opening (232) in the junction box (200). The box engagement region (500) can have a root surface (530), a leading tab (600), and a follower tab (700), wherein the leading tab has a leading tab perimeter edge (610) the follower tab (700) has a follower tab perimeter edge (710). The leading tab perimeter edge (610) and the follower tab perimeter edge (710) can define a tab perimeter diameter (760) that is larger than the opening (232) in the junction box (200).

Elements described herein can be employed in the embodiments of the conduit connector. In any of the various embodiments disclosed herein, the spring can: (i) be a leaf spring; (ii) comprise a notch (1102) located on a top end (1110) of the spring (1100) configured to engage a projection (1104) located on the body (400) at the secondary edge (520), projecting toward the leading tab (600); (iii) comprise a notch (1102) configured to engage a projection (1104) on the body (400) at the second edge (520); and/or (iv) comprise an angled lip (1116) located at a bottom end (1112), wherein the angle lip (1116) and the top end (1110) are configured to contact the secondary edge (520), while a mid-portion (1108) is configured to contact the junction box (200).

In any of the various embodiments the leading tab (600) can have a leading tab perimeter edge (610), a leading tab primary contact surface (620), a leading tab centering ledge (640), and a leading tab centering flank (650) extending from the root surface (530) to the leading tab centering ledge (640) at a flank angle (652), measured from the leading tab centering ledge (640) to the leading tab centering flank (650), that is between approximately ninety-one degrees and approximately one hundred and seventy-nine degrees. In these embodiments, the leading tab can have engagement element configured to engage the enclosure, e.g., to inhibit unintentional removal of the connector from the enclosure. Optionally, the engagement element can be a leading tab centering ledge configured to extend, when the connector is connected to the enclosure, from the leading tab primary contact surface through the opening such that the leading tab centering ledge exerts lateral pressure on the opening.

In the various embodiments, the body (400) can further comprise a nut engagement region (800) and a conduit engagement region cooperating with the conduit (300). In the various embodiments, the root surface (530) can defines a root surface diameter (532) that is not coaxial with a body inlet diameter (432) or a body outlet diameter (434). The various embodiments, can further comprise a conduit stop (438) projecting from the body (400) a conduit stop projection distance (440) thereby limiting the distance a conduit leading edge (330) can extend into the body (400). In the various embodiments, the root surface diameter (532) can have a root surface central axis (533) offset from a central axis (436) by at least 8% of the tab perimeter diameter (760), wherein the offset can optionally be toward the follower tab (700). In the various embodiments, the junction box (200) can further comprise a box thickness (225), wherein the distance from a leading tab primary contact surface (620) to a body distal end (410) is greater than 150% of the box thickness (225) and the leading tab centering ledge (640) has a ledge width (642) which is substantially equal to or less than the box thickness (225). In the various embodiments, the root surface (530) can have a minimum root surface width (534) which is the smallest distance between the box engagement region secondary edge (520) and an intersection between the leading tab centering flank (650) and the root surface (530) and where the minimum root surface width (534) is at least 150% of the box thickness (225). Also in the various embodiments, the follower tab (700) can have a follower tab centering ledge (740) and a follower tab centering flank (750) extending from the root surface (530) to the follower tab centering ledge (740) at a flank angle (752), measured from the follower tab centering ledge (740) to the follower tab centering flank (750), and wherein the body (400) is configured to be drawn tight to the junction box (200) by the spring (1100) such that the follower tab centering flank (750) directs a knockout edge (234) onto the follower tab centering ledge (740) thereby substantially centering a central axis (436) in the knockout (230) and pinching the junction box (200) between the spring (1100) and the leading tab (600) and the follower tab (700) thus releasably securing the body (400) to the junction box (200).

The conduit connector answers a long felt need for an electrical connector which can be installed quickly and easily without tools, does not require access to the interior of a junction box, and does not need to be disassembled before connecting it to an electrical enclosure. The electrical connector has utility, among other uses, in connection of conduit to junction boxes. The present application discloses an electrical connector having a body and optionally a compression nut. The body can have a box engagement region, a nut engagement region, a spring, and/or a conduit engagement region. The box engagement region facilitates connection with the junction box. The nut engagement region and or spring can cooperate with the compression nut to rigidly fix the body to the junction box. The conduit engagement region can cooperate with a variety of conduit, cables, and other electrical conductors.

The terms "first," "second," and so forth, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

The conduit connector of the instant application enables a significant advance in the state of the art. The detailed description set forth above in connection with the drawings is intended merely as a description of embodiments of the application, and is not intended to represent the only form in which the present application can be constructed or utilized. The description sets forth the designs, functions, means, and methods of implementing the application in connection with the illustrated embodiments. It is to be understood, however, that the same or equivalent functions and features can be accomplished by different embodiments that are also intended to be encompassed within the spirit and scope of the application.

What is claims is:

1. A conduit connector comprising:
    a body comprising a box engagement region capable of engaging an opening in an enclosure;
    wherein the box engagement region has a root surface, a leading tab, and a follower tab wherein the root surface and leading tab are located between a leading edge and a secondary edge;
    wherein a leading tab perimeter edge and a follower tab perimeter edge define a tab perimeter diameter that is larger than an opening in the enclosure; and
    a spring configured to engage the connector and the enclosure, wherein when the leading tab is inserted into the enclosure the spring can be disposed to engage the secondary edge and the enclosure, the spring comprising a notch configured to engage a projection on the body at the secondary edge.

2. The conduit connector of claim 1, wherein the spring comprises a leaf spring.

3. The conduit connector of claim 1, wherein the notch is located on a top end of the spring.

4. The conduit connector of claim 1, wherein the leading tab has a leading tab perimeter edge, a leading tab primary contact surface, a leading tab centering ledge, and a leading tab centering flank extending from the root surface to the leading tab centering ledge at a flank angle, measured from the leading tab centering ledge to the leading tab centering flank, that is between approximately ninety-one degrees and approximately one hundred and seventy-nine degrees.

5. The conduit connector of claim 1, wherein the body further comprises a nut engagement region and a conduit engagement region cooperating with the conduit.

6. The conduit connector of claim 1, wherein the root surface defines a root surface diameter that is not coaxial with a body inlet diameter or a body outlet diameter.

7. The conduit connector of claim 1, further including a conduit stop projecting from the body a conduit stop projection distance thereby limiting the distance a conduit leading edge can extend into the body.

8. The conduit connector of claim 7, wherein the root surface diameter has a root surface central axis offset from a central axis by at least 8% of the tab perimeter diameter.

9. The conduit connector of claim 8, wherein the offset is toward the follower tab.

10. The conduit connector of claim 1, wherein the enclosure further comprises a box thickness, wherein the distance from a leading tab primary contact surface to a body distal end is greater than 150% of the box thickness and the leading tab centering ledge has a ledge width which is substantially equal to or less than the box thickness.

11. The conduit connector of claim 1, wherein the root surface has a minimum root surface width which is the smallest distance between the box engagement region secondary edge and an intersection between the leading tab centering flank and the root surface and where the minimum root surface width is at least 150% of the box thickness.

12. The conduit connector of claim 1, wherein the follower tab has a follower tab centering ledge and a follower tab centering flank extending from the root surface to the follower tab centering ledge at a flank angle, measured from the follower tab centering ledge to the follower tab centering flank, and wherein the body is configured to be drawn tight to the enclosure by the spring such that the follower tab centering flank directs a knockout edge onto the follower tab centering ledge thereby substantially centering a central axis in the knockout and pinching the enclosure between the spring and the leading tab and the follower tab thus releasably securing the body to the enclosure.

13. The conduit connector of claim 1, wherein the leading tab has an engagement element configured to engage the enclosure to inhibit unintentional removal of the connector from the enclosure.

14. The conduit connector of claim 13, wherein the engagement element is a leading tab centering ledge configured to extend, when the connector is connected to the enclosure, from the leading tab primary contact surface through the opening such that the leading tab centering ledge exerts lateral pressure on the opening.

15. A conduit connector comprising:
a body comprising a box engagement region capable of engaging an opening in an enclosure;
wherein the box engagement region has a root surface, a leading tab, and a follower tab wherein the root surface and leading tab are located between a leading edge and a secondary edge;
wherein a leading tab perimeter edge and a follower tab perimeter edge define a tab perimeter diameter that is larger than an opening in the enclosure; and
a spring configured to engage the connector and the enclosure, wherein when the leading tab is inserted into the enclosure the spring can be disposed to engage the secondary edge and the enclosure, wherein the spring further comprises an angled lip located at a bottom end, wherein the angle lip and a top end of the spring are configured to contact the secondary edge, while a midportion is configured to contact the enclosure.

16. A method for connecting a connector to an enclosure comprising:
angling the connector toward an opening in the enclosure, wherein the connector comprises
a body comprising a box engagement region capable of engaging the opening in the enclosure;
wherein the box engagement region has a root surface, a leading tab, and a follower tab, wherein the leading tab has a leading tab perimeter edge the follower tab has a follower tab perimeter edge;
wherein the leading tab perimeter edge and the follower tab perimeter edge define a tab perimeter diameter that is larger than the opening in the enclosure;
inserting the leading tab into the opening;
inserting the follower tab into the opening;
straightening the connector in a downward direction while pushing the box engagement region in a forward and upward direction; and
placing a spring onto a body of the connector, wherein the spring engages the body and an enclosure, the spring comprising a notch which engages a projection on the body.

17. A conduit connector comprising:
a body comprising a box engagement region capable of engaging an opening in an enclosure;
wherein the box engagement region has a root surface, a leading tab, and a follower tab wherein the root surface and leading tab are located between a leading edge and a secondary edge;
wherein a leading tab perimeter edge and a follower tab perimeter edge define a tab perimeter diameter that is larger than an opening in the enclosure; and
a spring configured to engage the connector and the enclosure without use of a compression nut, wherein when the leading tab is inserted into the enclosure the spring can be disposed to engage the secondary edge and the enclosure;
wherein the connector is free of a compression nut.

18. The conduit connector of claim 17, wherein the leading tab has an engagement element configured to engage the enclosure to inhibit unintentional removal of the connector from the enclosure.

19. The conduit connector of claim 18, wherein the engagement element is a leading tab centering ledge configured to extend, when the connector is connected to the enclosure, from the leading tab primary contact surface through the opening such that the leading tab centering ledge exerts lateral pressure on the opening.

* * * * *